Figure 1:
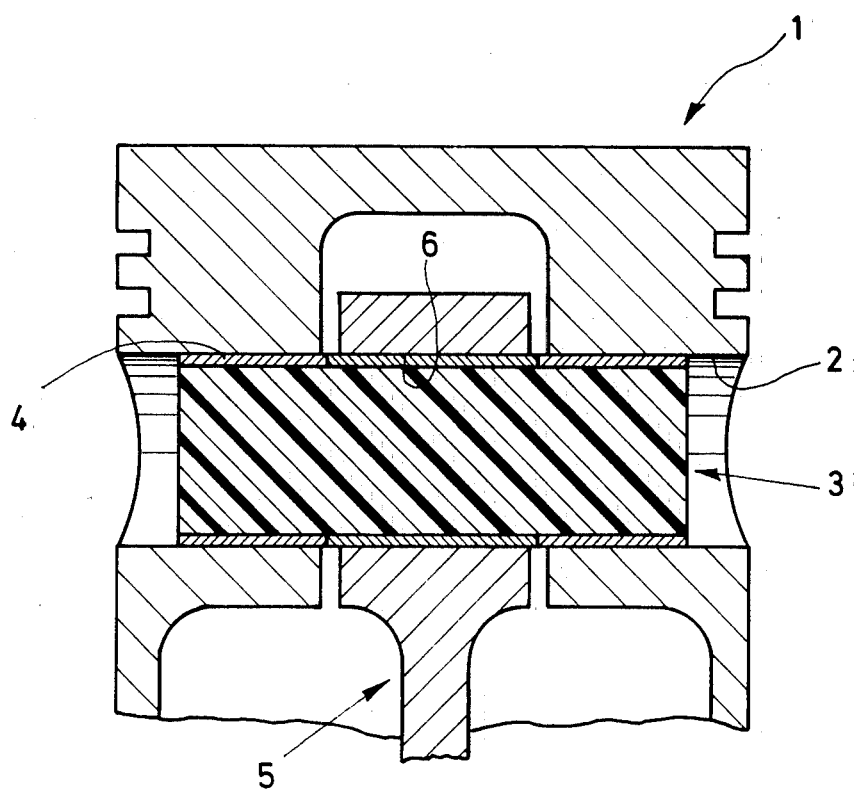

United States Patent [19]

Hinz et al.

[11] Patent Number: 4,572,058
[45] Date of Patent: Feb. 25, 1986

[54] PISTON CYLINDER SYSTEM, ESPECIALLY FOR INTERNAL COMBUSTION ENGINES

[75] Inventors: Bernhard Hinz; Gerhard Grüninger, both of Stuttgart, Fed. Rep. of Germany

[73] Assignee: Deutsche Forschungs- und Versuchsanstalt für Luft- und Raumfahrt e.V., Bonn, Fed. Rep. of Germany

[21] Appl. No.: 606,200

[22] Filed: May 2, 1984

[30] Foreign Application Priority Data

May 6, 1983 [DE] Fed. Rep. of Germany ....... 3316514

[51] Int. Cl.$^4$ ................................................. F16J 1/14
[52] U.S. Cl. ...................................... 92/187; 92/212; 92/216; 123/193 P; 156/182
[58] Field of Search .................. 92/187, 212; 308/2 R; 156/182; 123/193 P; 29/156.5 A; 428/113, 105, 902

[56] References Cited

U.S. PATENT DOCUMENTS

| | | | |
|---|---|---|---|
| 3,768,760 | 10/1973 | Jensen | 428/105 X |
| 4,102,221 | 7/1978 | Hatch | 428/113 X |
| 4,278,726 | 7/1981 | Wieme | 428/902 X |
| 4,430,906 | 2/1984 | Holtzberg et al. | 29/156.5 A |

FOREIGN PATENT DOCUMENTS

| | | |
|---|---|---|
| 1504771 | 10/1969 | Fed. Rep. of Germany . |
| 3023204 | 1/1981 | Fed. Rep. of Germany . |
| 2952117 | 6/1981 | Fed. Rep. of Germany . |
| 3009424 | 5/1982 | Fed. Rep. of Germany . |

Primary Examiner—Edward K. Look
Attorney, Agent, or Firm—Kenway & Jenney

[57] ABSTRACT

To reduce deformation of the piston pin for the rotating connection of a piston and a connecting rod in a piston cylinder system, especially in internal combustion engines, where the piston pin is made of fiber-reinforced composite material in which fibers running in different directions are placed, it is proposed that the piston pin is secured against rotation around its longitudinal axis in the piston or in the connecting rod, and has first regions in which the fibers are arranged in planes parallel to the piston pin axis and when secured against rotation in the piston, running parallel to the piston axis, or when secured against rotation in the connecting rod, running parallel to the connecting rod axis, so that they have a component running parallel to the piston axis or to the connecting rod axis.

28 Claims, 5 Drawing Figures

PISTON CYLINDER SYSTEM, ESPECIALLY FOR INTERNAL COMBUSTION ENGINES

This invention concerns a piston cylinder system, especially for internal combustion engines, with a piston pin made of a fiber-reinforced composite material in which fibers are arranged to run in different directions, for the rotating connection of a piston and a connecting rod.

In internal combustion piston engines, especially in reciprocating internal combustion engines and diesel engines, the piston and the connecting rod are connected to one another with the capability of rotating by means of a piston pin. This piston pin transmits the ignition pressure, compression, and inertial forces from the piston to the connecting rod. The piston pin in this case is inserted into a bore passing through the piston and in the connecting rod, and is normally mounted to be able to rotate in the piston and in the connecting rod. It can be secured against axial displacement, for example, by Seeger circlip rings.

The forces acting on the piston pin deform it and lead to a deflection of the pin axis on the one hand, and to an oval shape and shear stress of the pin cross section on the other. These deformations should be as slight as possible. On the other hand, however, the weight of the piston pin should be small to avoid high inertial forces.

It is already known how to manufacture piston pins from fiber-reinforced composite material (German patent application Disclosures Nos. 2,952,117, 3,023,204, 1,504,771).

Although these piston pins have substantially smaller weights than piston pins made of steel, they nevertheless show greater deflections than piston pins made of steel.

The purpose of this invention is to achieve substantially improved rigidity and strength values of the piston pin in a piston cylinder system of this sort.

This problem is solved pursuant to the invention in a piston cylinder system of the type mentioned initially by the fact that the piston pin is secured against rotation around its longitudinal axis in the piston or in the connecting rod, and has first regions in which the fibers are arranged in a plane parallel to the longitudinal axis of the piston, and if secured against rotation in the piston, parallel to the axis of the piston, or if secured against rotation in the connecting rod, in a plane running parallel to the axis of the connecting rod, so that they have a component running parallel to the axis of the piston or to the axis of the connecting rod, and by the fact that fibers are arranged in second regions of the piston pin running parallel to the axis of the piston pin.

In contrast to piston pins known up to now, therefore, the piston pin made of fiber composite materials does not have a rotationally symmetrical structure, but contains regions in which the fibers run parallel to the direction of the principal stress on the piston pin, i.e., parallel to the axis of the piston, when the piston pin is mounted not to rotate in the piston, or parallel to the axis of the connecting rod when the piston pin is mounted not to rotate in the connecting rod. A high shear strength of the piston pin results from this arrangement of the fibers in the first regions, while the fibers running parallel to the axis of the piston pin in the second regions produce a high bending strength of the piston pin.

It is beneficial if the fibers in the first regions are embedded in layers running parallel to the planes. Preferably, the fibers in these layers run diagonally to the axis of the piston or to the axis of the connecting rod and cross one another in adjacent layers, i.e., the direction of the fibers in adjacent layers is different.

It is particularly beneficial if the fibers in the layers run at an angle of approximately 45° to the axis of the piston or to the axis of the connecting rod.

In a preferred form of embodiment, it is provided that a layer with fibers running parallel to the longitudinal axis of the piston is placed between each pair of layers with fibers running diagonally and crossing one another.

It is especially favorable if the piston pin has layers only in its core with fibers that have a component running parallel to the axis of the piston or to the axis of the connecting rod, and if only fibers running parallel to the longitudinal axis of the piston pin are located above and below the core. This gives the core, which is exposed to particularly high shear stresses, a particularly high shear strength, while the regions on the top and bottom of the piston, which are primarily subjected to bending stress, are given a high bending strength.

It can also be provided here that fibers running only parallel to the axis of the piston pin are also placed on the two opposite sides of the piston pin.

The core can be cemented to the regions at the top and bottom, and optionally to the side sections, in which the fibers run parallel to the axis of the piston pin.

The core preferably has a rectangular cross section.

It is therefore possible to manufacture the core separately from the side sections and to join the piston pin together only subsequently from these individual parts. On the other hand, however, the structure described can also be made in one piece and then be reworked mechanically to obtain the circular-cylindrical shape of the piston pin.

In another preferred example of embodiment, it is provided that fibers with components oriented parallel to the axis of the piston or to the axis of the connecting rod are placed in two layers at a distance from one another which run parallel to the axis of the piston or to the axis of the connecting rod and parallel to the axis of the piston pin, that the two layers are connected to one another through a bed running perpendicular to them through the center of the piston pin, in which fibers are placed with components oriented perpendicular to the axis of the piston pin and parallel to the bed, and that fibers running parallel to the axis of the piston pin are placed in the other sections of the piston pin. The layers and the beds therefore form an H-shaped supporting frame which is surrounded by regions with fibers running parallel to the axis of the piston pin.

It is beneficial here if the fibers placed on the insides of the two parallel layers are arranged in the shape of a U and change over from one layer through the bed running perpendicular to the layers into the other layer.

Preferably, the fibers in the parallel layers and in the bed running perpendicular to them are embedded in the layers or the bed in the form of fabrics, and it is desirable if the thread directions of the fabric in the parallel layers run diagonally to the axis of the piston or to the axis of the connecting rod.

In a beneficial refinement, it is provided that the H-shaped supporting element formed of the two parallel layers and the bed running perpendicular to them is subsequently joined as a premanufactured structural unit to the regions attached subsequently in a continuous drawing process with fibers running parallel to the axis of the piston pin.

Figure 2:
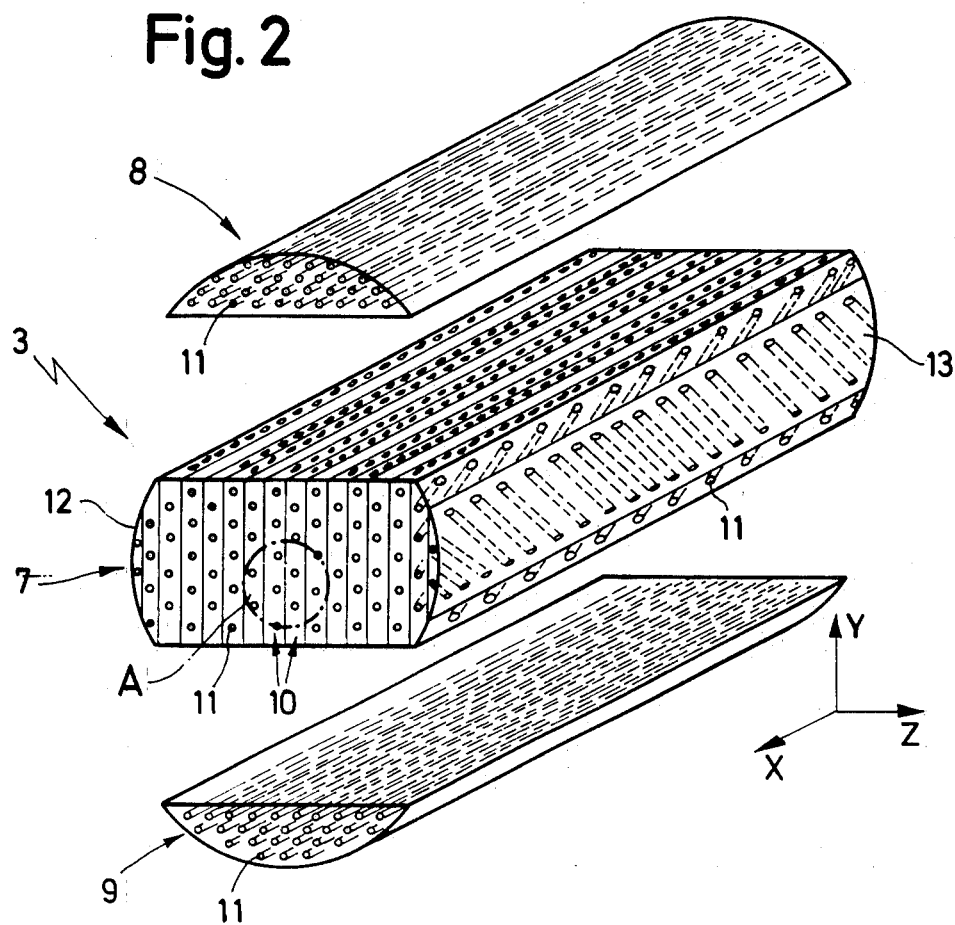
Figure 3:
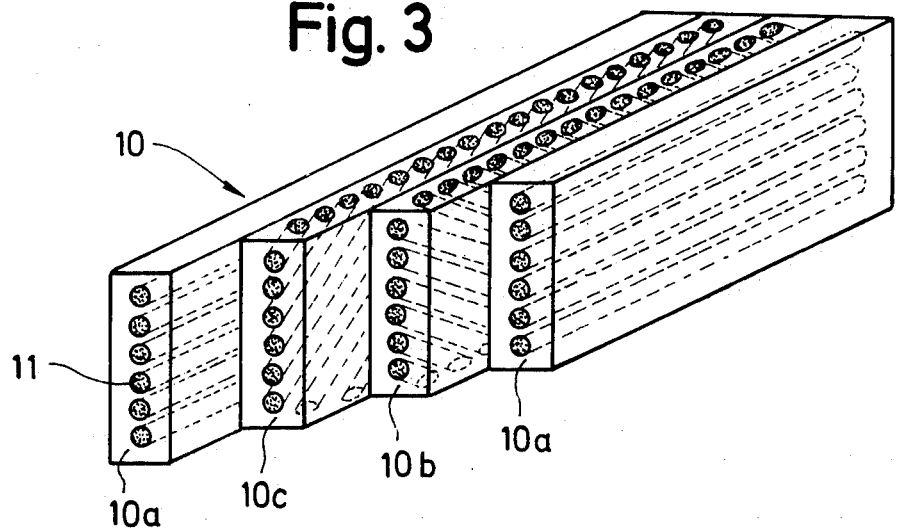
Figure 4:
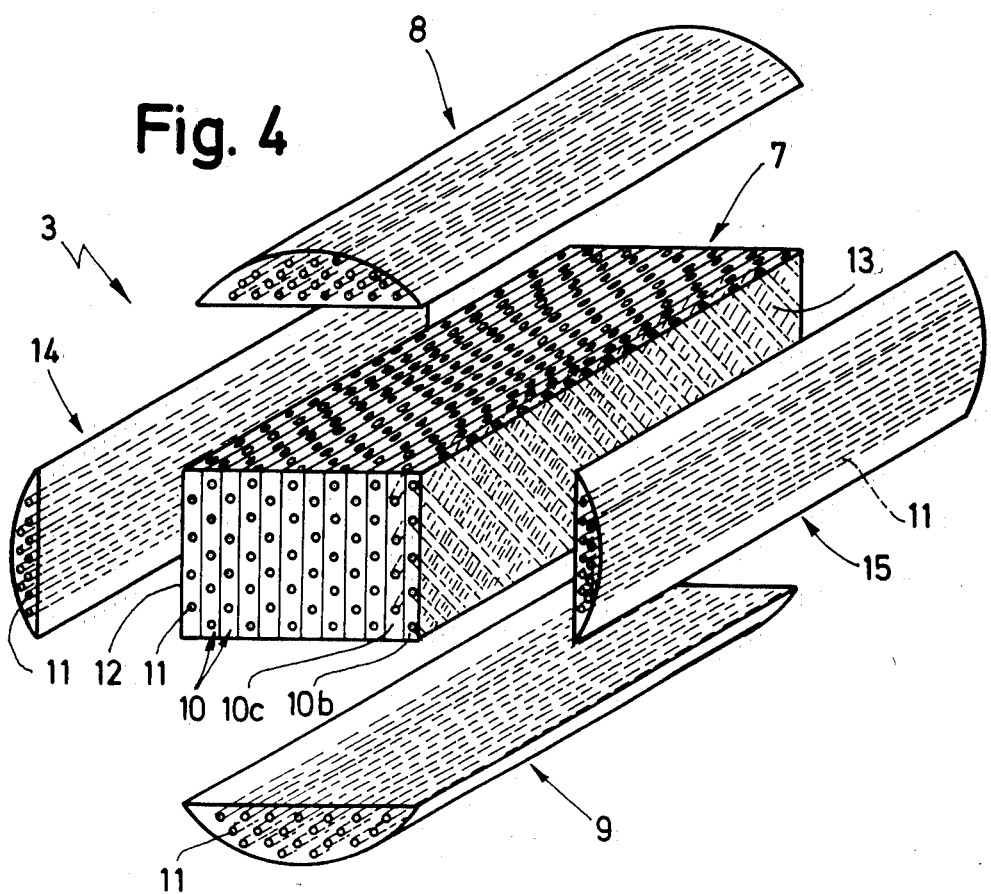
Figure 5:
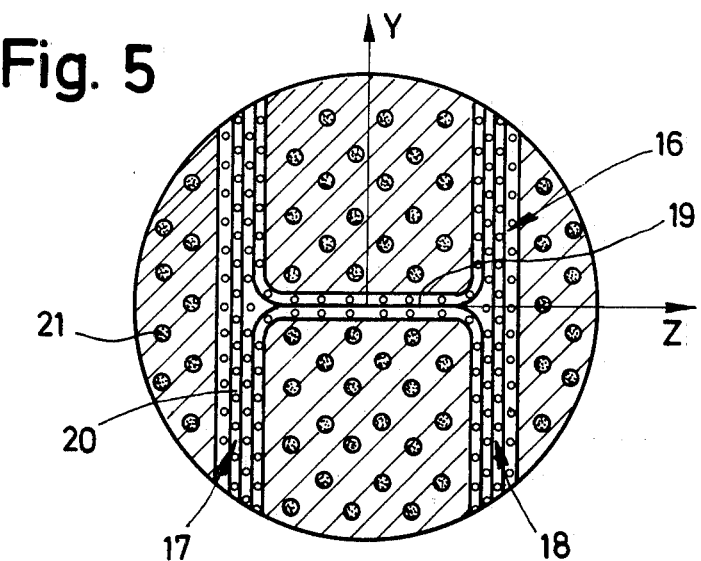

The following description of preferred forms of embodiment of the invention serves for more detailed explanation in combination with the drawing. The drawing shows:

FIG. 1 a sectional view through the joining point between a piston and a connecting rod head;

FIG. 2 a perspective view of the individual parts of a piston pin pursuant to a first preferred example of embodiment of the invention;

FIG. 3 an enlarged partial view of the region A in FIG. 2;

FIG. 4 a view similar to FIG. 2 of another preferred example of embodiment of a piston pin, and FIG. 5 a cross sectional view of another preferred example of embodiment of a piston pin.

In a piston 1 shown only partially in FIG. 1, a piston pin 3 is mounted in a bore 2 passing through it, which consists essentially of a fiber-reinforced composite material and is surrounded by a metallic friction bearing layer 4. In the example of embodiment illustrated, this is divided into three component regions lying next to one another, with the division between adjacent component regions being in the region of changeover from the piston to the head of a connecting rod 5. The piston pin passes through a bore 6 in the connecting rod 5 and thus supports it inside the piston 1.

To secure the piston pin 3 against axial displacement and against rotation, it is held in a press fit either in the bore 2 through the piston 1 or in the bore 6 through the connecting rod 5. In case of a fixed support in the piston, the piston rod 5 is mounted to rotate with respect to the piston pin, and conversely, in case of a fixed mount in the connecting rod 5, the piston pin is held to rotate in the bore 2 of the piston 1.

It is possible to omit the friction bearing layer 4 in the regions in which the piston pin is held in a press fit either in the piston or in the connecting rod.

In the following description, the vertical central axis of the piston is called the piston axis, the central longitudinal axis of the connecting rod is called the connecting rod axis, and the central longitudinal axis of the piston pin is called the piston pin axis. To establish the preferred direction of the piston pin, a rectangular coordinate system is introduced, with the piston pin axis being positioned parallel to the X-direction. The Y-direction with a piston pin held in a press fit in the piston is determined by the piston axis, while on the other hand, with a piston pin held in a press fit in the connecting rod, the Y-direction is determined by the connecting rod axis. The Z-direction is perpendicular to the X-direction and to the Y-direction (FIG. 2).

A first preferred example of embodiment of a piston pin will be described with the use of FIGS. 2 and 3. The piston pin shown in exploded illustration in FIG. 2 comprises a core 7, and upper parts 8 and 9 which are joined together along a plane running parallel to the X-Z plane, preferably by cementing.

The core 7 is made up of layers 10 running parallel to the X-Y plane, in which fibers 11 run in different directions. One possible fiber pattern is shown in FIG. 3. According to this, all fibers run parallel to the piston pin axis in a first layer 10a, i.e., parallel to the X-direction. In an adjacent layer 10b, all of the fibers are positioned parallel to the X-Y plane, inclined to the Y-axis, preferably at an angle of 45°. In the following layer 10c, the fibers also run in the X-Y plane inclined to the Y-direction, but with opposite slope from the fibers in the adjacent layer 10b, likewise preferably at an angle of 45°. This layer structure is repeated, i.e., a layer 10a again follows the layer 10c.

In the upper parts 8 and 9, which have a segmental cross section, the fibers 11 run parallel to the piston pin axis, i.e., parallel to the X-direction.

In the example of embodiment illustrated in FIG. 2, the core 7 has an essentially rectangular cross section, with the two side faces 12 and 13 having circular boundaries in cross section, so that a circular cross section results when the top section 8 and the bottom section 9 are cemented on.

In the structure described, the top section 8 and the bottom section 9 produce a high bending strength of the piston pin because of the fibers 11 running parallel to the X-direction, while the fibers running diagonally in layers 10b and 10c lead to a high shear strength of the piston pin, preferentially in the core region, which is exposed to especially high shear stresses. This construction results in an especially small deflection under the usual stress in operation, since fibers running parallel to the piston pin axis are placed in the regions in which primarily bending stresses occur, or in the top section 8 and the bottom section 9.

The piston pin illustrated in FIGS. 2 and 3 can be manufactured, for example, by producing the core as well as the top section and bottom section, each by itself, in a continuous drawing or pressing process, and then cementing them to one another along their parting faces. In a next operating procedure, the piston pin obtained in this way is ground to a diameter corresponding to the friction bearing layer 4 and is cemented to it.

A modification of the example of embodiment illustrated in FIG. 2 is a piston pin consisting only of the core 7 and the friction bearing sleeve 4. In this example of embodiment, the core 7 has a completely circular cross section.

In a modification of the example of embodiment illustrated in FIG. 2, it is possible in the core 7 to omit layers with fibers running parallel to the piston pin axis, so that then only layers corresponding to layers 10b and 10c are placed in the core. It is also possible to replace the fibers running parallel in the individual layers 10 by fabric, so that, for example, fibers running diagonally and crossing one another are located within a single layer. In this case, it would be possible to construct adjacent layers 10 identically, i.e., to embed a rather large number of fabric layers with the same orientation in the material in the core 7.

The fibers running parallel to the piston pin axis can also be replaced by fabric inlays.

The direction of the fibers in layers 10b and 10c can vary; for example, it is even possible to have the fibers in these layers run parallel to the Y-direction, or perpendicular to the piston pin axis, although an arrangement like that illustrated in FIGS. 2 and 3, in which the fibers run at approximately 45° and their slope alternates in adjacent layers, is particularly beneficial.

A modified form of embodiment is illustrated in FIG. 4. Parts corresponding to one another carry the same reference symbols as in the example of embodiment of FIGS. 2 and 3.

In this example of embodiment, the core 7 contains only layers 10b and 10c with fibers 11 arranged diagonally to the Y-direction with the slope of the fibers in adjacent layers being opposite. In contrast to the example of embodiment of FIG. 2, the core also has a rectangular, preferably square cross section, and besides a top section 8 and a bottom section 9, the core is joined to side sections 14 and 15 with segmental cross section, which are also cemented to the flat side faces 12 and 13 of the core, just like the top section 8 and the bottom section 9. In the side sections 14 and 15, the fibers 11 run parallel to the piston pin axis. Such a piston pin does show a somewhat larger deflection than that of FIG. 2, but because of the reduced cost of grinding it can be manufactured more economically.

The fibers can be replaced by fabrics in this example of embodiment also, as has been explained for the example of embodiment of FIG. 2.

In another preferred example of embodiment which is illustrated in FIG. 5 only in cross section, the piston pin contains an H-shaped supporting frame 16, which is formed of two layers 17 and 18 arranged parallel to and at a distance from one another, and a bed 19 joining these with one another and running through the piston axis. The layers 17 and 18 in this case are parallel to the X-Y plane, while the bed 19 lies in the X-Z plane. Fibers 20, which run either parallel to the Y-direction or diagonally to it, and running parallel to the layers are positioned within the layers 17 and 18. In the same way, fibers 20 which are oriented either parallel to the Z-direction or diagonally to it are embedded in the bed 19. These can be fibers positioned parallel to one another, but preferably the fibers are embedded in the form of fabrics whose threads preferably run diagonally to the Y-direction in the layers 17 and 18 and diagonally to the Z-direction in the bed 19.

It is also beneficial if the fibers embedded in the sides of the layers 17 and 18 facing one another have the shape of a U, so that they pass from one layer through the bed 19 joining the two layers, into the other layer.

The H-shaped supporting frame which extends over the entire length of the piston pin is surrounded in a continuous drawing process with a material in which fibers 21 are positioned running parallel to the piston pin axis. The piston pin manufactured in this way is machined on its circumference as in the case described above in such a way that it can be fitted into a friction bearing layer.

By the described refinement, a high shear strength is produced in the X-Y plane, and the fibers 21 running parallel to the piston pin axis guarantee a high bending strength.

By a suitable choice of the number of fiber beds which extend over the entire plane of the layers 17 and 18, and of the fiber beds which pass over into the other layer in the form of a U, the piston pin can be designed so that the deflection, i.e., the sum of the bending and shear deformation, is minimal.

The fibers can consist of carbon, boron, glass, polyamides, or mixtures of these substances; high temperature-resistant modifications of epoxy, polyester, or polyimide thermosetting polymers, or high temperature-resistant thermoplastics such as polycarbonates or polysulfones can be used as the matrix material in which the fibers are embedded.

The non-rotating arrangement of the piston pin in the connecting rod or in the piston therefore makes it possible to depart from the conventional rotationally symmetrical structure of a piston pin and to select the arrangements of fibers corresponding to the particular mechanical stresses on the piston pin, i.e., the fibers can be arranged corresponding to the principal stress directions, since the orientation of the piston pin relative to the principal load directions is essentially retained because of the non-rotating mounting of the piston pin.

SUMMARY

In order to achieve a reduced deformation of the piston pin in a piston cylinder system, especially for internal combustion engines, with a piston pin made of fiber-reinforced composite material in which fibers running in different directions are placed, for the rotating connection of a piston and a connecting rod, it is proposed that the piston pin is secured against rotation around its longitudinal axis in the piston or in the connecting rod, and has first regions in which the fibers are arranged in planes parallel to the piston pin axis and when secured against rotation in the piston, running parallel to the piston axis, or when secured against rotation in the connecting rod, running parallel to the connecting rod axis, so that they have a component running parallel to the piston axis or to the connecting rod axis.

We claim:

1. Piston cylinder system, especially for internal combustion engines, with a piston pin made of a fiber-reinforced composite material, in which fibers running in different directions are placed, for the rotating connection of a piston and a connecting rod, characterized by the fact that the piston pin (3) is secured against rotation around its longitudinal axis (x-axis) in the piston (1), and has first regions (layers 10b, 10c; layers 17, 18), in which the fibers (11; 20) are arranged in planes running parallel to the piston pin axis (X-axis), running parallel to the piston axis, in such a way that they have a componant running parallel to the piston axis and that in second regions (layer 10a, top section 8, bottom section 9, side sections 14, 15) of the piston pin (3), fibers (11; 21) are positioned running parallel to the piston pin axis (X-direction).

2. Piston cylinder system pursuant to claim 1, characterized by the fact that the fibers (11) in the first regions are embedded in layers (10) running parallel to the planes.

3. Piston cylinder system pursuant to claim 2, characterized by the fact that the fibers (11) in the layers (10b, 10c) run diagonally to the piston axis (Y-direction), and that fibers (11) of adjacent layers (10b, 10c) cross one another.

4. Piston cylinder system pursuant to claim 3, characterized by the fact that the fibers (11) in the layers (10b, 10c) run at an angle of approximately 45° to the piston axis (Y-direction).

5. Piston cylinder system pursuant to one of the claims 3, characterized by the fact that a layer (10a) with fibers (11) running parallel to the piston pin axis (X-direction) is placed between each pair of layers (10b, 10c) with fibers (11) running diagonally and crossing one another.

6. Piston cylinder system pursuant to claim 1, characterized by the fact that the piston pin (3) has layers (10b, 10c) only in its core (7) with fibers (11) which have a component running parallel to the piston axis (Y-direction), and that fibers (11) running only parallel to the piston pin axis (X-direction) are placed above and below the core (7).

7. Piston cylinder system pursuant to claim 6, characterized by the fact that fibers (11) running only parallel to the piston pin axis (X-direction) are also placed on the two opposite side parts (14, 15) of the piston pin (3).

8. Piston cylinder system pursuant claim 6, characterized by the fact that the core (7) is cemented to the regions on the top and bottom sides (top part 8, bottom part 9) and optionally to the side parts (14, 15) in which the fibers (11) run parallel to the piston pin axis (X-direction).

9. Piston cylinder system pursuant to claim 8, characterized by the fact that the core (7) has a rectangular cross section.

10. Piston cylinder system pursuant to claim 2, characterized by the fact that fibers (20) with components oriented parallel to the piston axis (Y-direction) are placed in two layers (17, 18) arranged at a distance from one another which run parallel to the piston axis (Y-direction) and parallel to the piston pin axis (X-direction), that the two layers (17, 18) are joined to one another through a bed (19) running perpendicular to them through the center of the piston pin (3) in which fibers are placed with components oriented perpendicular to the piston pin axis (X-axis) and parallel to the bed (19), and that fibers (21) running parallel to the piston pin axis (X-direction) are placed in the remaining parts of the piston pin (3).

11. Piston cylinder system pursuant to claim 10, characterized by the fact that the fibers (20) placed on the insides of the two parallel layers (17, 18) are arranged in the shape of a U and pass from one layer (17) through the bed (19) running perpendicular to the layers (17, 18) into the other layer (18).

12. Piston cylinder system pursuant to claim 10, characterized by the fact that the fibers (20) are embedded in the layers (17, 18) or the bed (19) in the parallel layers (17, 18) and in the bed (19) running perpendicular to them in the form of fabrics.

13. Piston cylinder system pursuant to claim 12, characterized by the fact that the thread directions of the fabric in the parallel layers (17, 18) run diagonally to the piston axis (Y-direction).

14. Piston cylinder system pursuant to claim 10, characterized by the fact that the H-shaped supporting element (16) formed from the two parallel layers (17, 18) and the bed (19) running perpendicular to them is joined as a premanufactured structural unit to the regions subsequently attached in a continuous drawing process with fibers (21) running parallel to the piston pin axis (X-direction).

15. Piston cylinder system, especially for internal combustion engines, with a piston pin made of a fiber-reinforced composite material, in which fibers running in different directions are placed, for the rotating connection of a piston and a connecting rod, characterized by the fact that the piston pin (3) is secured against rotation around its longitudinal axis (x-axis) in the connecting rod (5), and has first regions (layers 10b, 10c; layers 17, 18), in which the fibers (11; 20) are arranged in planes running parallel to the piston pin axis (X-axis), running parallel to the connecting rod axis, in such a way that they have a component running parallel to the connecting rod axis, and that in second regions (layer 10a, top section 8, bottom section 9, side sections 14, 15) of the piston pin (3), fibers (11; 21) are positioned running parallel to the piston pin axis (X-direction).

16. Piston cylinder system pursuant to claim 15, characterized by the fact that the fibers (11) in the first regions are embedded in layers (10) running parallel to the planes.

17. Piston cylinder system pursuant to claim 16, characterized by the fact that the fibers (11) in the layers (10b, 10c) run diagonally to the connecting rod axis (Y-direction), and that fibers (11) of adjacent layers (10b, 10c) cross one another.

18. Piston cylinder system pursuant to claim 17, characterized by the fact that the fibers (11) in the layers (10b, (10c) run at an angle of approximately 45° to the connecting rod axis (Y-direction).

19. Piston cylinder system pursuant to claim 17, characterized by the fact that a layer (10a) with fibers (11) running parallel to the piston pin axis (X-direction) is placed between each pair of layers (10b, 10c) with fibers (11) running diagonally and crossing one another.

20. Piston cylinder system pursuant to claim 15, characterized by the fact that the piston pin (3) has layers (10b, 10c) only in its core (7) with fibers (11) which have a component running parallel to the connecting rod axis (Y-direction), and that fibers (11) running only parallel to the piston pin axis (X-direction) are placed above and below the core (7).

21. Piston cylinder system pursuant to claim 20, characterized by the fact that fibers (11) running only parallel to the piston pin axis (X-direction) are also placed on the two opposite side parts (14, 15) of the piston pin (3).

22. Piston cylinder system pursuant to claim 20, characterized by the fact that the core (7) is cemented to the regions on the top and bottom sides (top part 8, bottom part 9) and optionally to the side parts (14, 15) in which the fibers (11) run parallel to the piston pin axis (X-direction).

23. Piston cylinder system pursuant to claim 22, characterized by the fact that the core (7) has a rectangular cross section.

24. Piston cylinder system pursuant to claim 16, characterized by the fact that fibers (20) with components oriented parallel to the connecting rod axis (Y-direction) are placed in two layers (17, 18) arranged at a distance from one another which run parallel to the connecting rod axis (Y-direction) and parallel to the piston pin axis (X-direction), that the two layers (17, 18) are joined to one another through a bed (19) running perpendicular to them through the center of the piston pin (3) in which fibers are placed with components oriented perpendicular to the piston pin axis (X-axis) and parallel to the bed (19), and that fibers (21) running parallel to the piston pin axis (X-direction) are placed in the remaining parts of the piston pin (3).

25. Piston cylinder system pursuant to claim 24, characterized by the fact that the fibers (20) placed on the insides of the two parallel layers (17, 18) are arranged in the shape of a U and pass from one layer (17) through the bed (19) running perpendicular to the layers (17, 18) into the other layer (18).

26. Piston cylinder system pursuant to claim 24, characterized by the fact that the fibers (20) are embedded in the layers (17, 18) or the bed (19) in the parallel layers (17, 18) and in the bed (19) running perpendicular to them in the form of fabrics.

27. Piston cylinder system pursuant to claim 26, characterized by the fact that the thread directions of the fabric in the parallel layers (17, 18) run diagonally to the connecting rod axis (Y-direction).

28. Piston cylinder system pursuant to claim 24, characterized by the fact that the H-shaped supporting element (16) formed from the two parallel layers (17, 18) and the bed (19) running perpendicular to them is joined as a premanufactured structural unit to the regions subsequently attached in a continuous drawing process with fibers (21) running parallel to the piston pin axis (X-direction).

* * * * *